US008547939B1

(12) United States Patent
Vargantwar (10) Patent No.: US 8,547,939 B1
(45) Date of Patent: Oct. 1, 2013

(54) BASE STATION FREQUENCY BAND PRIORITIZATION (75) Inventor: Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 282 days.

(21) Appl. No.: 12/946,110

(22) Filed: Nov. 15, 2010

(51) Int. Cl.
H04W 4/00 (2009.01)
H04W 36/00 (2009.01)
H04W 36/18 (2009.01)
H04W 36/22 (2009.01)
H04W 36/24 (2009.01)

(52) U.S. Cl.
CPC .............. H04W 36/18 (2013.01); H04W 36/22 (2013.01); H04W 36/24 (2013.01)
USPC ........... 370/333; 370/329; 455/441; 455/436; 455/442

(58) Field of Classification Search
USPC ................. 370/328, 329, 331–333; 455/436, 455/440–443
See application file for complete search history.

(56) References Cited

U.S. PATENT DOCUMENTS

| 6,081,714 | A | 6/2000 | Wakizaka |
| 6,119,005 | A | 9/2000 | Smolik |
| 6,430,414 | B1 | 8/2002 | Sorokine et al. |
| 6,456,606 | B1 | 9/2002 | Terasawa |
| 6,539,206 | B1 | 3/2003 | Min et al. |
| 6,654,609 | B2 | 11/2003 | Kim |
| 6,982,971 | B2 | 1/2006 | Tiedemann, Jr. et al. |
| 7,065,361 | B1 | 6/2006 | Fortuna |
| 2003/0064729 | A1* | 4/2003 | Yamashita ..................... 455/451 |
| 2008/0032726 | A1* | 2/2008 | Tajima et al. ................. 455/509 |
| 2009/0036135 | A1* | 2/2009 | Matsuo et al. ................ 455/443 |

* cited by examiner

Primary Examiner — Paul H Masur (57) ABSTRACT

A method of operating a wireless system comprises transmitting wireless signals from a first base station over a first and a second frequency band, transmitting wireless signals from a second base station over the first frequency band, processing loading of the first frequency band of the first base station to determine a user priority between the first and the second frequency band of the first base station, transmitting an indication of the user priority to a plurality of wireless devices, wherein the plurality of wireless devices select between the first and the second frequency band based on the user priority, determining a distance between the first base station and a wireless device utilizing the second frequency band, determining a velocity of the wireless device, and transmitting a message for delivery to the wireless device if the distance exceeds a first threshold or the velocity exceeds a second threshold.

20 Claims, 6 Drawing Sheets

BASE STATION FREQUENCY BAND PRIORITIZATION

TECHNICAL BACKGROUND

Wireless communication systems use base stations to provide wireless communication services to wireless communication devices which are present in the base stations' coverage area. Wireless communication devices establish communication sessions with the base stations through transmission and reception of radio frequency waves. This approach allows the wireless communication devices to maintain communications even though they are mobile. Providing wireless communication coverage over a large geographical area usually requires multiple base stations because the radio frequency waves have finite geographic ranges and because the base stations typically have fixed physical locations.

In order to allow wireless communication devices to have freedom to move about a geographic area without experiencing communication interruption, the base stations and their associated control systems must be able to accommodate the transition of a communication session from one base station to another. In these handoff processes, a wireless communication device communicating with one base station can transition out of the coverage area of that base station and into the coverage area of another base station without losing continuity of the communications. Coordination is required between the base stations, their associated control equipment, and the wireless device in order to accomplish this handoff. The specific steps necessary to complete a handoff vary depending on many factors including whether the two base stations involved in the transition are operating on the same frequency band or on different frequency bands.

Overview

A wireless communication system includes a first base station and a second base station. The first base station transmits wireless communication signals over a first frequency band and over a second frequency band. The second base station transmits wireless communication signals over the first frequency band and processes loading of the first frequency band of the first base station to determine a user priority between the first frequency band of the first base station and the second frequency band of the first base station. The second base station also transmits an indication of the user priority to wireless communication devices. The wireless communication devices select between the first frequency band and the second frequency band based on the user priority. The first base station also determines a distance between the first base station and a wireless communication device utilizing the second frequency band of the first base station and determines a velocity of the wireless communication device. If the distance exceeds a first threshold or the velocity exceeds a second threshold, the first base station transmits a message to the wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
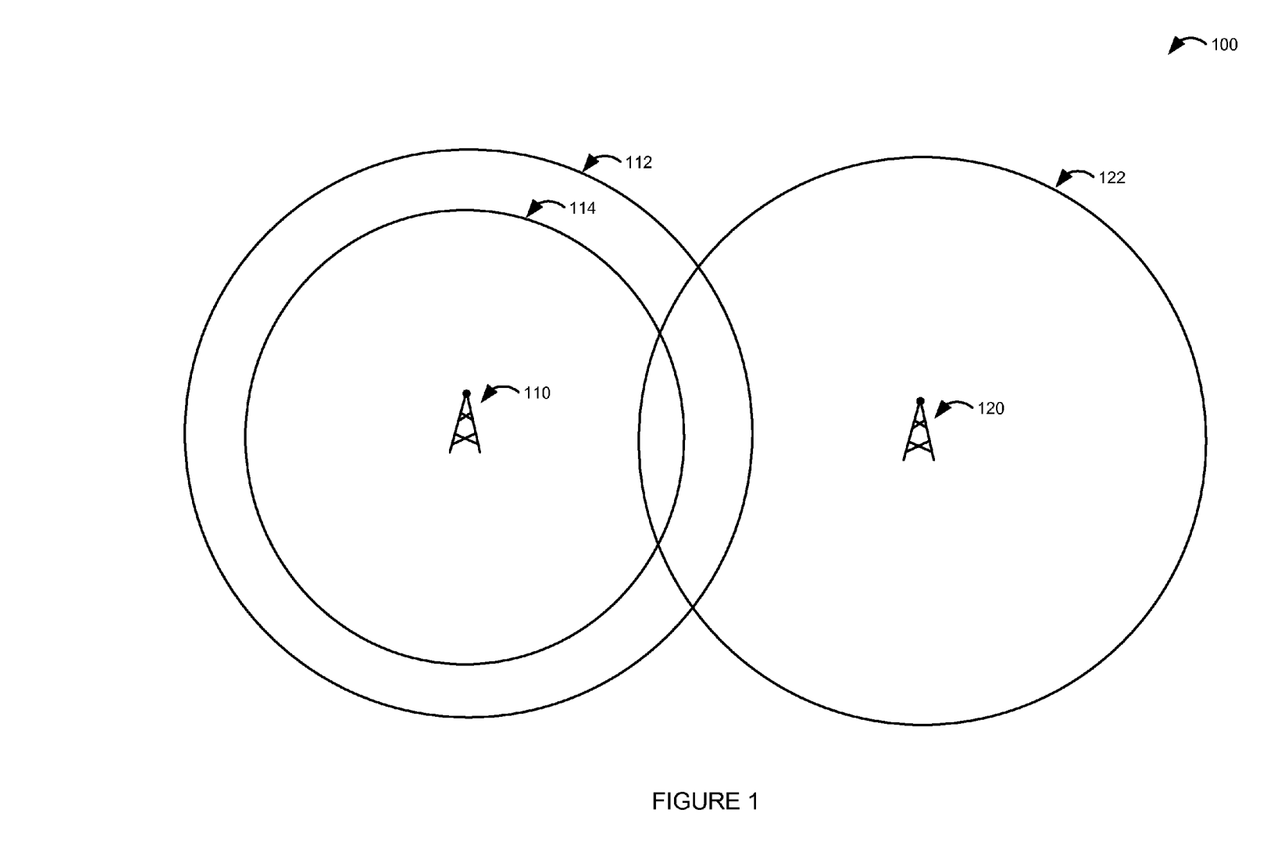
FIG. 1 illustrates a wireless communication system.

FIG. 1 illustrates wireless communication system 100. Wireless communication system 100 comprises base station 110, base station 120, coverage area 112, coverage area 114, and coverage area 122. Base station 110 transmits wireless communication signals over a first frequency band within coverage area 114. Base station 110 also transmits wireless communication signals over a second frequency band within coverage area 112. Base station 120 transmits wireless communication signals over the first frequency band within coverage area 122.

Figure 2:
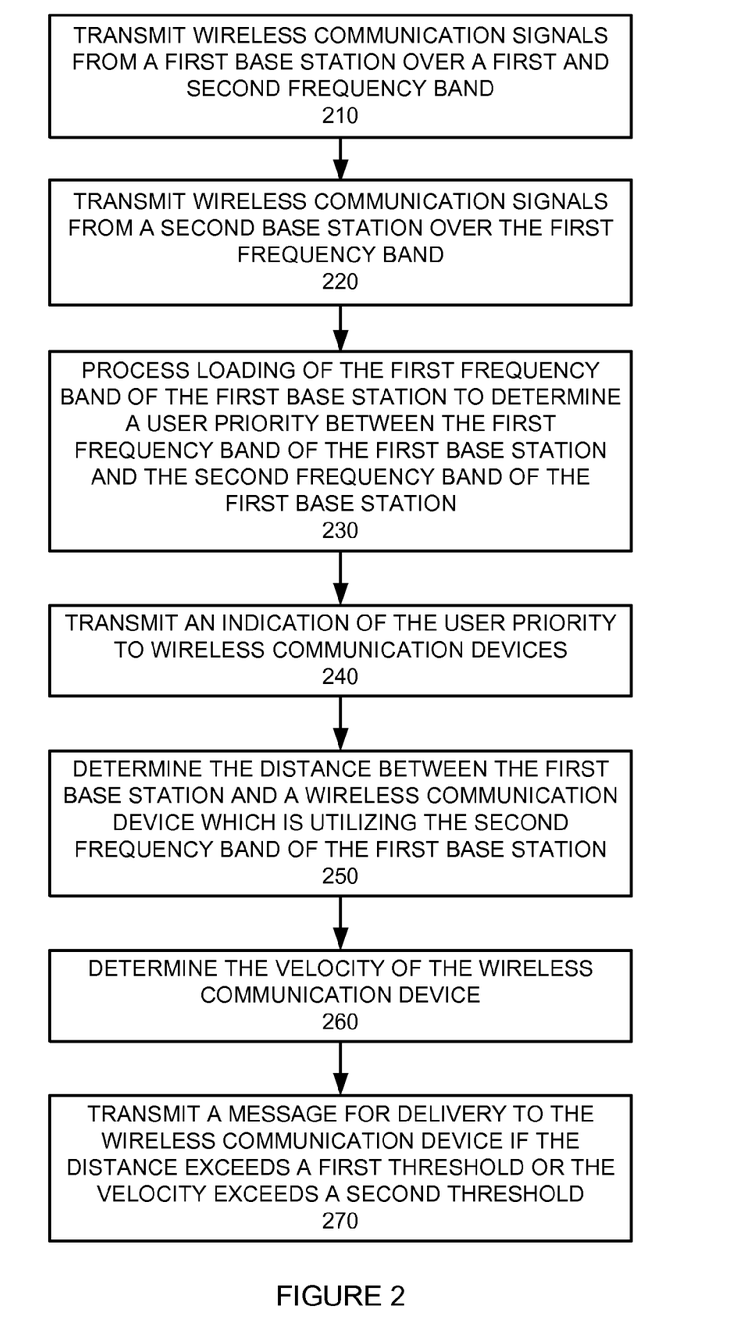
FIG. 2 illustrates an operation of the wireless communication system.

FIG. 2 illustrates the operation of wireless communication system 100. Base station 110 transmits wireless communication signals over both a first frequency band and a second frequency band (210). Base station 120 also transmits wireless communication signals over the first frequency band (220). Base station 120 processes loading of the first frequency band of base station 110 to determine a user priority between the first frequency band of base station 110 and the second frequency band of base station 110 (230). Base station 120 then transmits an indication of the user priority to wireless communication devices (240). The wireless communication devices select between the first frequency band and the second frequency band based on the user priority. Base station 110 determines a distance to wireless communication device utilizing the second frequency band of base station 110 (250), determines a velocity of the wireless communication device (260), and transmits a message for delivery to the wireless communication device if the distance exceeds a first threshold or the velocity exceeds a second threshold (270).

In another example of the operation of wireless communication system 100, the user priority determined in step 230 comprises a list which includes the first frequency band of base station 110, the second frequency band of base station 110, and the first frequency band of base station 120. It should be understood that the user priority may also contain additional frequency bands of base station 110, base station 120, as well as the frequency bands associated with other base stations.

Referring back to FIG. 1, base station 110 and base station 120 comprise RF communication circuitry and an antenna. The RF communication circuitry typically includes an amplifier, filter, RF modulator, and signal processing circuitry of various types. Base station 110 and base station 120 may also comprise a router, server, memory device, software, processing circuitry, cabling, power supply, network communication interface, structural support, or other communication components. Wireless network protocols which may be used by base station 110 and base station 120 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other network protocol that facilitates communication with wireless communication devices.

Base station 110 transmits wireless communication signals over a first frequency band which are usable by wireless communication devices within coverage area 114. Base station 110 simultaneously transmits wireless communication signals over the second frequency band such that they are usable by wireless communication devices within coverage area 112. Base station 120 transmits wireless communication signals over the first frequency band such that they are usable by wireless communication devices within coverage area 122. The coverage areas illustrated in FIG. 1 are for example purposes only. The size and shape of coverage areas may vary depending on topography, base station placement, base station design, base station operation, further division of the coverage area into sectors, or other factors.

Figure 3:
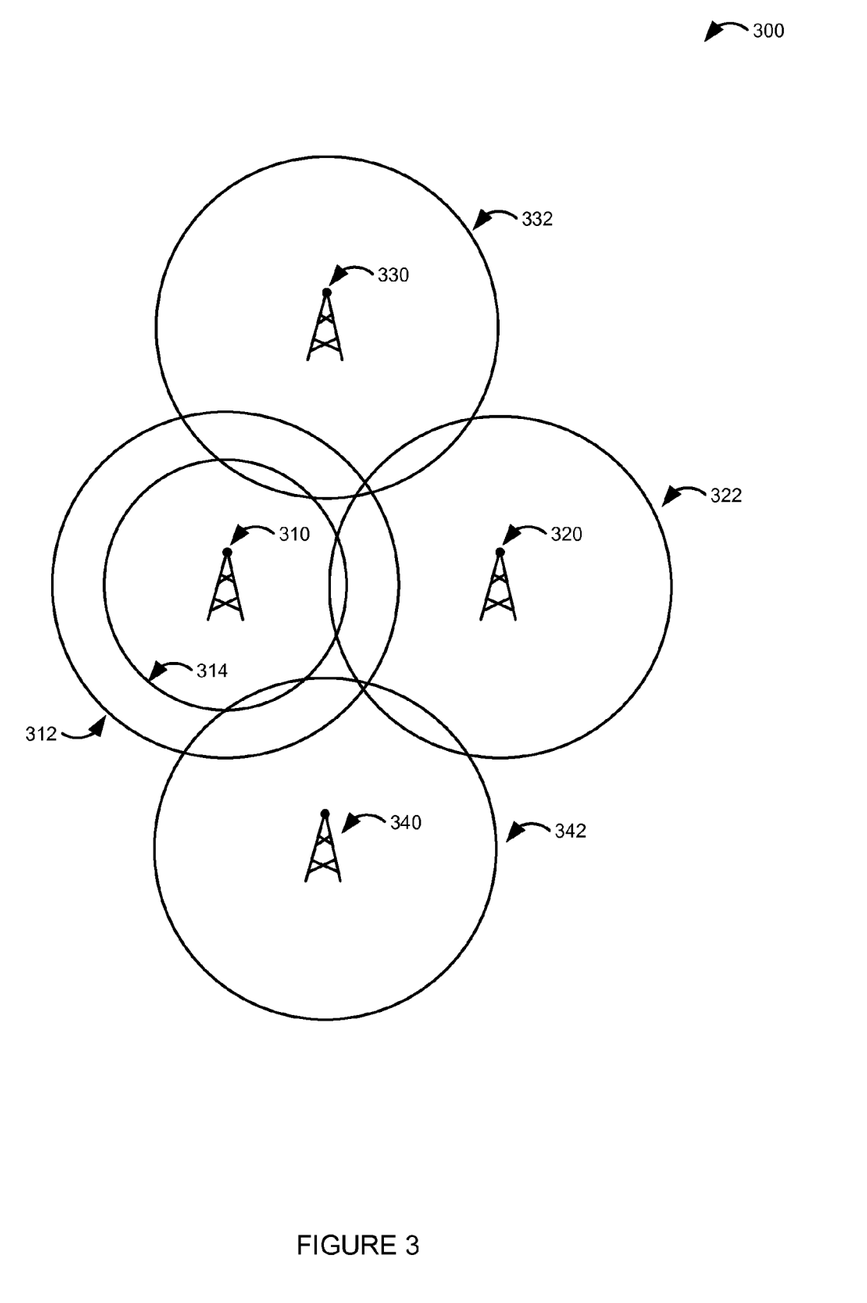
FIG. 3 illustrates a wireless communication system.

FIG. 3 illustrates wireless communication system 300. Wireless communication system 300 is an example of wireless communication system 100, although wireless communication system 100 may be implemented in alternate forms or have alternate methods of operation. Wireless communication system 300 comprises base station 310, base station 320, base station 330, and base station 340. Base station 310 is an example of base station 110, although base station 110 may be implemented in alternate forms or have alternate methods of operation. Base stations 320, 330, and 340 are examples of base station 120, although base station 120 may be implemented in alternate forms or have alternate methods of operation.

Base station 310 transmits wireless communication signals over a first frequency band throughout coverage area 314. Base station 310 also transmits wireless communication signals over a second frequency band throughout coverage area 312. Each of base stations 320, 330, and 340 transmit wireless communication signals over the first frequency band throughout coverage areas 322, 332, and 342 respectively. The illustrated coverage areas are approximate. Actual coverage areas do not typically end abruptly as depicted. The wireless communication signals become gradually weaker over distance.

The base stations of wireless communication system 300 are intentionally located and configured such that their coverage areas overlap. When joined together by backhaul connections and other equipment, these base stations and the other associated equipment form an interconnected cellular radio network. The overlapping coverage areas of the base stations enable mobile wireless communication devices to communicate with each other, as well as communicate with transceivers in other locations or systems, via the base stations. Communication can occur even if one or more of the wireless communication devices is moving through more than one coverage area during the communication session. Ideally, at any point within the network, a wireless communication device received at least one wireless communication signal from at least one base station. In some areas, a wireless communication device may receive more than one wireless communication signal from one or more of the base stations.

A base station may transmit on one or more frequency bands depending on the type of wireless communication devices it is designed to communicate with, the number of simultaneous communications it is designed to support, and the operational environment, as well as other factors. A base station such as base station 310 which transmits on multiple frequency bands is typically operated in densely populated areas where there are high concentrations of wireless communication devices which may be using the services of the base station. A base station of this configuration may exist in a downtown area or in or near a large sports venue to accommodate the high density of potential users. Base stations transmitting on a single frequency band, like base stations 320, 330, and 340, are typically more common. Each of these base stations normally serves a lower density of users resulting in the need for only a single frequency band.

Although four base stations are illustrated in wireless communication system 300, a wireless communication system will typically be comprised of additional base stations to cover a larger geographical area. The base stations will each transmit wireless communication signals over one, two, or more frequency bands and may be arranged in various configurations to provide coverage over the area of interest. Each base station and the associated antennas and transceiver equipment may be further broken down into smaller functional sections called sectors where multiple sectors make up the coverage area of a single base station.

Figure 4:
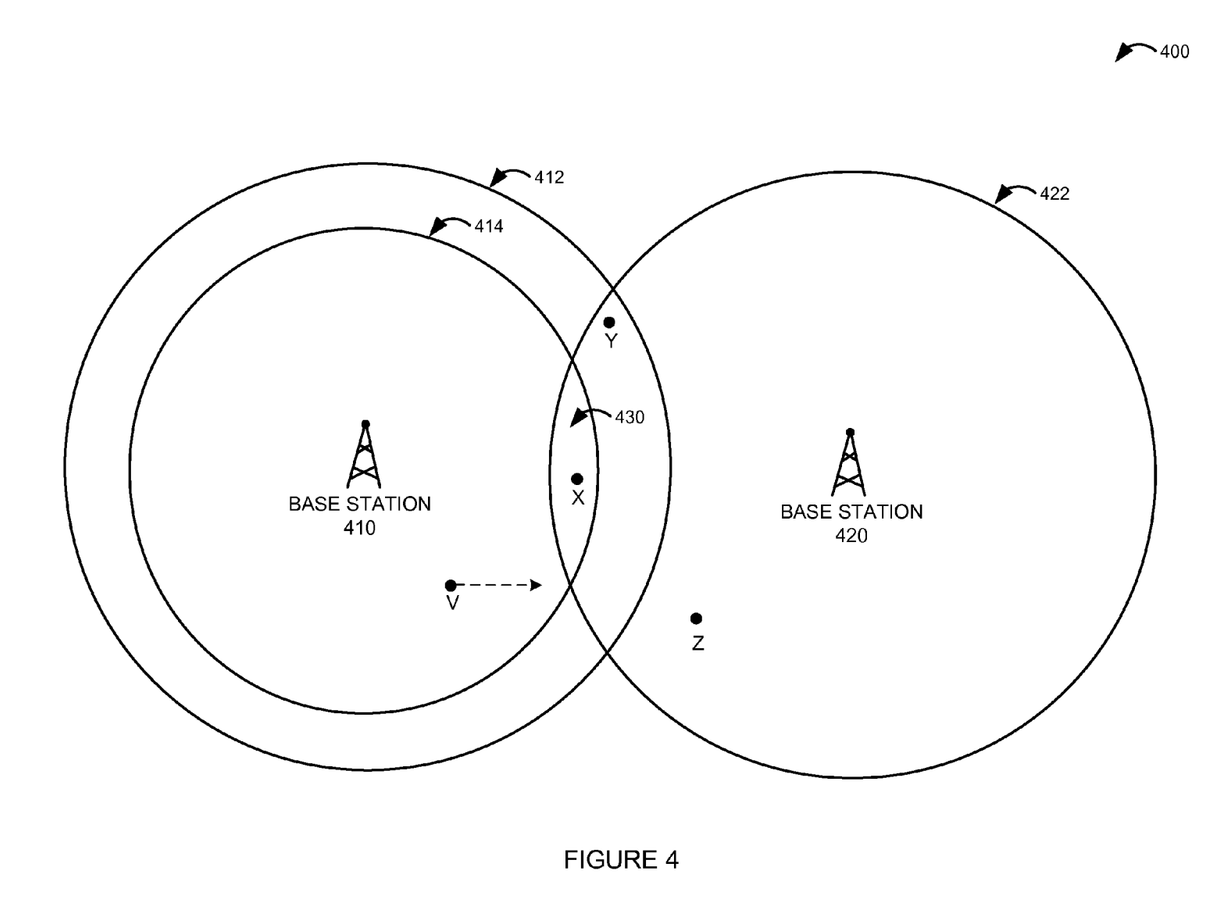
FIG. 4 illustrates a wireless communication system with example user locations.

FIG. 4 illustrates a wireless communication system with example user locations. Wireless communication system 400 comprises base station 410 and base station 420. Wireless communication system 400 is an example of wireless communication system 100, although wireless communication system 100 may be implemented in alternate forms or have alternate methods of operation. Wireless communication system 400 comprises base station 410 and base station 420. Base station 410 is an example of base station 110, although base station 110 may be implemented in alternate forms or have alternate methods of operation. Base station 420 is an example of base station 120, although base station 120 may be implemented in alternate forms or have alternate methods of operation. Wireless communication system 400 may include additional base stations but only two are illustrated and described for purposes of clarity.

Base station 410 transmits wireless communication signals over coverage area 414 in a first frequency band and over coverage area 412 in a second frequency band. Base station 420 transmits in the first frequency band over coverage area 422. A few examples of possible physical locations of wireless communication devices are illustrated by the points V, X, Y, and Z. A much larger number of wireless communication devices and locations are typical, however only four are shown for purposes of illustration.

The base stations which comprise wireless communication system 400 are linked together by backhaul connections and other equipment. Since the coverage areas of the base stations overlap, this configuration enables mobile wireless communication devices to participate in communication sessions even if moving through more than one of the coverage areas during the communication session. A wireless communication device may be communicating with another wireless communication device within wireless communication system 400 or may be communicating with devices in other networks or systems. Ideally, at any point within the network, a wireless communication device is able to receive wireless communication signals from one or more of the base stations over one or more frequency bands.

A wireless communication device may move from the coverage area of one base station into the coverage area of another base station during an ongoing communication. As the wireless communication device continues moving further away from a base station it is communicating with it, it eventually begins receiving wireless communication signals from one or more other neighboring base stations. The transition of a mobile wireless communication device from one base station to the next may be performed seamlessly without interruption of the communication session. This process is called a handoff.

For example, in FIG. 4, a wireless communication device which in coverage area 422 may have started communication with base station 420 at point Z. As the wireless communication device starts moving and gets closer to base station 410, it eventually ends up at a physical location which is included in both coverage area 422 of base station 420 and coverage area 414 of base station 410. One such physical location is represented by point X. While at point X, the wireless communication device is receiving wireless communication signals from both base station 410 and base station 420 even though the communication session is still taking place with base station 420. As the wireless communication signals associated with coverage area 414 become stronger and the wireless communication signals associated with coverage area 422 become weaker, wireless communication system 400, in cooperation with the wireless communication device, will eventually transition the ongoing communication session from base station 420 to base station 410. Ideally, this transition occurs without interruption of the communication session.

Since the wireless communication signals associated with coverage area 414 and coverage area 422 both utilize the same frequency band, the transceiver in the wireless communication device does not have to change frequencies when being transitioned, or handed off, between base station 420 and base station 410. This type of handoff is referred to as a soft handoff. The handoff process is significantly more complex and involves many more steps than discussed here. However, the important aspect of the soft handoff for purposes of this illustration is that the wireless communication device is transitioning from a frequency band of one base station to the same frequency band of another base station.

In contrast, a hard handoff occurs when a mobile communication device in communication with a first base station is transitioned to another base station but the frequency band used for communication with the second base station is different than the frequency band used with the first base station. A wireless communication device in position Y moving away from base station 420 and moving toward base station 410 may be subject to this type of hard handoff. While at point Y, the wireless communication device is receiving wireless communication signals from both base station 410 and base station 420 even though the communication session is taking place with base station 420.

As the wireless communication signals associated with the coverage area 412 become stronger and the wireless communication signals associated with coverage area 422 become weaker, wireless communication system 400, in cooperation with the wireless communication device, will eventually transition the ongoing communication session from base station 420 to base station 410. Because coverage area 412 is associated with a different frequency band than coverage area 422, the wireless communication device must switch frequencies for the handoff to occur. Ideally, this occurs without interruption of the communication session. However, the frequency change makes it more difficult than the previously described soft handoff because it typically requires a break-before-make transition. A soft handoff typically allows a brief period where the wireless communication device is communicating with both base stations. For this reason, absent other controlling circumstances, a hard handoff is usually less preferred than a soft handoff.

The mobile communication device at point X of FIG. 4 is communicating with base station 420 over the first frequency band which has coverage area 422. At point X, the wireless communication device is also within the coverage area of base station 410 with respect to both coverage area 412 and coverage area 414. Since coverage area 414 is associated with the first frequency band, the frequency band already being used by the wireless communication device at point X in its communications with base station 420, this transition is a soft handoff and would normally be the preferred transition. A wireless communication device moving away from base station 420 at point Y would not have this option. Coverage area 412 is associated with the second frequency band of base station 410 and would require a hard handoff to base station 410 at point Y because coverage area 412 is associated with a different frequency band than the one currently being used by the wireless communication device. However, in many cases, the wireless communication device at point Y may also be eligible for handoff to other neighboring base stations as illustrated in FIG. 3.

Figure 5:
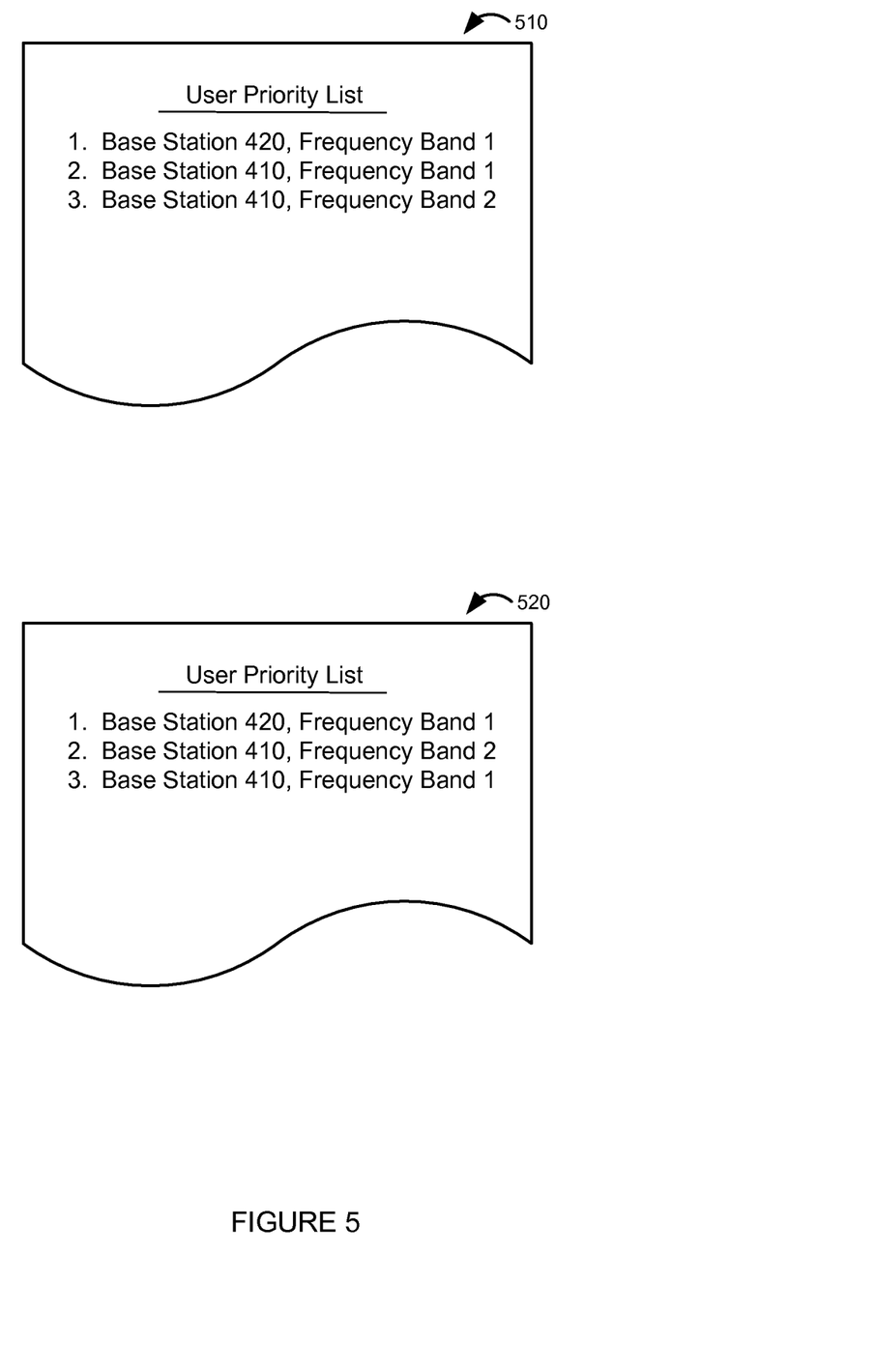
FIG. 5 illustrates user priority lists

Base stations typically transmit user priority lists to wireless communication devices in their coverage area. These user priority lists are also sometimes called channel lists or neighbor lists. FIG. 5 illustrates two user priority lists of the frequency bands used by the transmitting base station as well as neighboring base stations. The purpose of the user priority list is to guide the wireless devices in selecting the preferred frequency bands to use in that geographic area and the preferred frequency bands to consider when leaving that base station and completing a handoff to another base station. There are many factors and considerations which are taken into account in creating a user priority list, determining the order of the list, and determining how it is utilized by wireless communication devices.

User priority list 510 of FIG. 5 is an example user priority list which may be transmitted by base station 420. If a wireless communication device is operating within coverage area 422, the preferred frequency band is the frequency band used by base station 420. However, if the wireless communication device is leaving coverage area 422, it will need to determine what other frequency band and base station it may switch to in order to continue communications. User priority list 510 aids this process by notifying the wireless communication device of the other available frequency bands and base stations in the area and the suggested priority of those frequency bands. In this example, user priority list 510 indicates that the wireless communication device should first try the first frequency band of base station 410 when a handoff is necessary. If that frequency band is unavailable or unusable for some reason, the second frequency band of base station 410 is the next alternative.

The priority illustrated in user priority list 510 is a typical order because the soft handoff from the first frequency band of base station 420 to the first frequency band of base station 410 is typically preferred over a hard handoff to the second frequency band of base station 410. In most implementations, the priority list will be more complex and include more entries to identify the additional handoff possibilities associated with other neighboring base stations like those illustrated in FIG. 3. A base station may be surrounded by six or more other base stations each having one or more frequency bands to which a wireless communication device may handoff and all these possibilities may be included in the user priority list. Other factors may play a role in how the additional frequency bands are prioritized including communication protocol, base station ownership, traffic flow patterns, and feature availability, as well as other factors.

In contrast to the explanation above, there may be situations in which the default preferred soft handoff priority may not be the best option. In FIG. 4, overlap coverage area 430 is comprised of wireless communication signal coverage from all three frequency bands associated with FIG. 4, the first and second frequency bands of base station 410 and the first frequency band of base station 420. The communications in area 430 are more challenging due to the inherent interference associated with the overlap, particularly due to the fact that both base stations are operating on at least one common frequency band. The interference may become worse and signal quality further degraded if the first frequency band of base station 410 is heavily loaded with users, particularly in coverage area 430.

Although a handoff from the first frequency band of base station 420 to the first frequency band of base station 410 is preferred in most circumstances, it may be advantageous under the heavy loading circumstances described above to instead opt for a hard handoff to the second frequency band of base station 410. This allows the wireless communication device to avoid some of the interference and the overlapping coverage area as well as avoid contributing further to the heavy loading of the first frequency band of base station 410.

In an example, base station 420 processes the loading of the first frequency band of base station 410 to determine a user priority between the first frequency band of base station 410 and the second frequency band of base station 410. If the first frequency band of base station 410 is heavily loaded, it may be advantageous for base station 420 to change the user priority user priority list 510 to user priority list 520. In user priority list 520, the second frequency band of base station 410 is assigned higher priority than the first frequency band of base station 410. Base station 420 transmits indication of this modified user priority list to the wireless communication devices. The wireless communication devices select between the first frequency band and the second frequency band based on user priority list 520. In this way, wireless communication devices will avoid incurring the problems associated with a handoff to the heavy loaded and potentially interfered first frequency band of base station 410, which would normally occur under typical circumstances.

The loading of the first frequency band of base station 410 may be measured in terms of the number of users, the amount of traffic being transferred over the frequency band, or using other metrics. It should be understood that the loading threshold may be a fixed value or may be variable. In the case a variable threshold is used, the chosen value may depend on various factors including network conditions, projected network conditions, time of day, or other factors.

In many cases, the second frequency band may only be used by one or a small number of base stations in the immediate geographic area. As illustrated in FIG. 3, each of base stations 310, 320, 330, and 340 transmit wireless communication signals using the first frequency band. Only base station 310 additionally transmits wireless communication signals using the second frequency band, as illustrated by coverage area 312. Although changing the user priority list as described above in response to loading of the first frequency band of base station 410 may be advantageous for wireless communication devices which are transitioning into the coverage area of base station 410, assigning priority to the second frequency band may not be advantageous for all users.

If the base stations adjacent to base station 410 are not using the second frequency band, a wireless communication device utilizing the second frequency band of base station 410 will be required to make a hard handoff when it leaves coverage area 412. For this reason, it may be advantageous to more selectively choose which wireless communication devices initiate calls on the second frequency band. Even though the user priority list being broadcast to all users indicates that the second frequency band has higher priority than the first frequency band, it may be desirable to direct individual devices which meet particular criteria to do otherwise. This may be accomplished by transmitting messages to the individual wireless communication devices for which a different user priority may be appropriate.

The wireless communication devices which are most likely to be leaving coverage area 412 of base station 410 in the near future are the most likely candidates to receive a message indicating a different priority of the frequency bands. Wireless communication devices which are already near the edge of coverage area 412 present an increased risk of leaving the coverage area in the short term. Wireless communication devices which are moving across the coverage area at a high velocity also pose an increased risk of leaving the coverage area in the short term. Therefore, it may be advantageous for base station 410 to provide alternate user priority instructions to these select wireless communication devices.

In an example, base station 410 determines a distance to a wireless communication device utilizing the second frequency band of base station 410. Base station 410 also determines a velocity of the wireless communication device. If the distance exceeds a first threshold or the velocity exceeds a second threshold, base station 410 transmits a message for delivery to the wireless communication device.

The distance threshold is chosen based, in part, on the possibility that wireless communication devices within a short distance of the edge of the coverage area have a higher risk of beginning a call using the second frequency band and leaving the coverage area before that call is complete. For example, it may be undesirable for a wireless communication device at location Y in FIG. 4 to start a call on the second frequency band because there is significant risk that device will leave coverage area 412 during the call and have to transition to base station 420, or another adjacent base station which does not use the second frequency band, through a hard handoff.

Similarly, the velocity threshold is chosen based, in part, on the likelihood that wireless communication devices which are traveling at a high rate of speed have an increased risk of beginning a call using the second frequency band and leaving the coverage area before that call is complete. A wireless communication device at point V of FIG. 4 and traveling at a relatively high rate of speed, in a car for example, might begin a call on the second frequency band which is not completed before the device leaves the coverage area. The velocity may be determined through measurements made by the base station, may be reported to the base station by the wireless communication device, or may be determined by some other method.

If a particular wireless device exceeds either the distance or velocity threshold, it may be desirable to instruct the wireless communication device to avoid using the second frequency band for newly initiated calls. Instructing these select devices in this manner will prevent unnecessary hard handoffs. It should be understood that other factors may also be used in determining the thresholds including the loading of the other frequency bands, the configurations of neighboring base stations, characteristics of the wireless device, as well as other factors.

In another example, the message sent to the selected wireless communication devices described above comprises instructions to initiate future calls using the first frequency band. In this way, the wireless communication devices which are near the edge of the coverage area or traveling at a high velocity will initiate new calls on the first frequency band and avoid potentially having to perform a hard handoff shortly thereafter. This is true even though the priority list being broadcast to the broader population of wireless communication devices in the area may resemble user priority list 520 which assigns the second frequency band a higher priority than the first frequency band. While the user priority list being transmitted to all users may generally be migrating more users onto the second frequency band, it is undesirable to push these particular users onto the second frequency band. The message instructs the selected devices at increased risk of leaving the coverage area to avoid starting a new call using the second frequency band.

Figure 6:
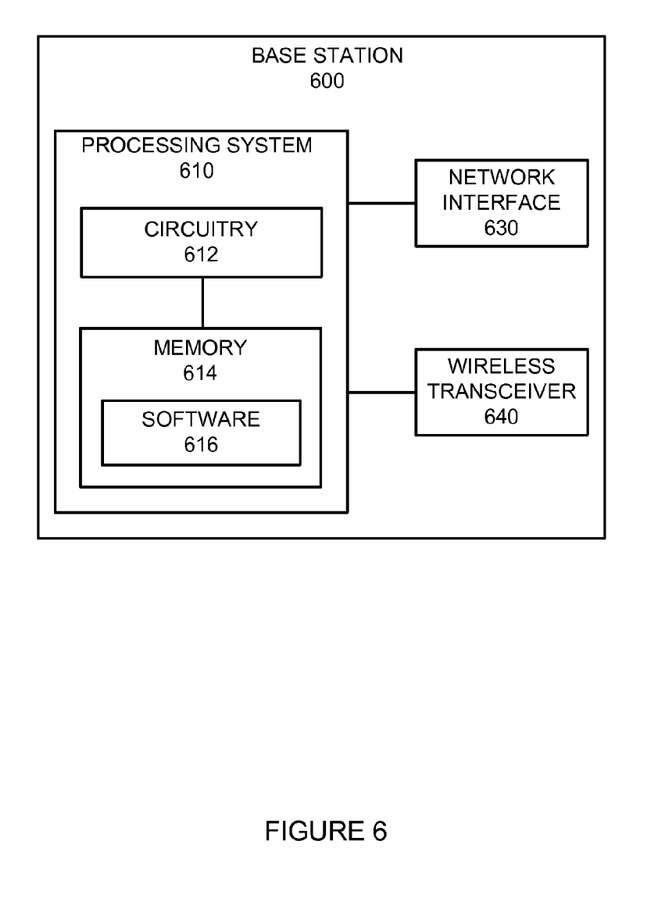
FIG. 6 illustrates a base station. .

FIG. 6 illustrates a base station. Base station 600 is an example of any of the base stations in FIGS. 1, 3, and 4, although the base stations of FIGS. 1, 3, and 4 may be implemented in alternate forms or have alternate methods of operation. Base station 600 is comprised of processing system 610, network interface 630, and wireless transceiver 640. Processing system 610 communicates with network interface 630 and wireless transceiver 640. Processing system 610 comprises circuitry 612 and memory 614. Memory 614 stores software 616. Base station 600 may also include other components such as a server, amplifier, data storage system, cabling, and power supply. Base station 600 may reside in a single device or may be distributed across multiple devices. Base station 600 may be a discrete system or may be integrated within other systems Network interface 630 comprises communication ports, signal processing circuitry, software, or other communication components. Network interface 630 may use various communication protocols, such as time division multiplex, internet, Ethernet, or some other communication format, including combinations thereof. Network interface 630 receives loading information pertaining to the frequency bands of other base stations which allows base station 600 to determine user priorities between the frequency bands.

Circuitry 612 comprises microprocessor and other circuitry that retrieves and executes software 616 from memory 614. Memory 614 comprises a non-transitory computer-readable storage medium, such as a disk drive, flash drive, data storage circuitry, or some other memory apparatus. Memory 614 could be a single device or could be distributed across multiple devices. Circuitry 612 is typically mounted on one or more circuit boards that may also hold memory 614 and portions of network interface 630 or wireless transceiver 640.

Software 616 comprises computer programs, firmware, or some other form of non-transitory computer-readable processing instructions. Software 616 may include an operating system, utilities, drivers, network interfaces, applications, or some other type of software. When executed by circuitry 612, software 616 directs processing system 610 to operate base station 600 as described herein. In particular, software 616 directs processing system 610 to process loading of the frequency bands of another base station to determine user priority.

Wireless transceiver 640 comprises an antenna, filter, amplifier, signal processing circuitry, software, or other communication components. Wireless transceiver 640 may use various wireless communication formats, such as CDMA, GSM, EV-DO, WiMAX, 3GPP LTE, Wi-Fi or some other wireless communication format, including combinations thereof. Wireless transceiver 640 transmits wireless communication signals over designated frequency bands and transmits an indication of user priority to wireless communication devices.

In one example of operation, processing system 610 of base station 600 transmits wireless communication signals over a first frequency band and over a second frequency band through wireless transceiver 640. Processing system 610 of a second base station, also illustrated by base station 600, transmits wireless communication signals over the first frequency band through wireless transceiver 640. Processing system 610 of the second base station processes loading of the first frequency band of the first base station through information received at network interface 630 to determine a user priority between the first frequency band of the first base station and the second frequency band of the first base station. Based on instructions provided in software 616, processing system 610 transmits an indication of the user priority to wireless communication devices through wireless transceiver 640. The wireless communication devices select between the first frequency band and the second frequency band based on the user priority.

Processing system 610 of the first base station determines a distance between the first base station and a wireless communication device utilizing the second frequency band of the first base station and determines a velocity of the wireless communication device based on instructions provided in software 616. If the distance exceeds a first threshold or the velocity exceeds a second threshold, processing system 610 transmits a message to the wireless communication device through wireless transceiver 640.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication system comprising:
a first base station configured to:
transmit wireless communication signals over a first frequency band and over a second frequency band; and
a second base station configured to:
transmit wireless communication signals over the first frequency band;
process loading of the first frequency band of the first base station to determine a user priority between the first frequency band of the first base station and the second frequency band of the first base station; and
transmit an indication of the user priority to a plurality of wireless communication devices, wherein the plurality of wireless communication devices select between the first frequency band and the second frequency band based on the user priority;
the first base station further configured to:
determine a distance between the first base station and a wireless communication device which is utilizing the second frequency band of the first base station;
determine a velocity of the wireless communication device; and
if the distance exceeds a first threshold or the velocity exceeds a second threshold, transmit a message for delivery to the wireless communication device.

2. The wireless communication system of claim 1 wherein the message comprises instructions to initiate future calls using the first frequency band.

3. The wireless communication system of claim 1 wherein the user priority comprises a list which includes the first frequency band of the first base station, the second frequency band of the first base station, and the first frequency band of the second base station.

4. The wireless communication system of claim 3 wherein the second frequency band of the first base station is assigned a higher priority than the first frequency band of the first base station if the loading of the first frequency band of the first base station exceeds a third threshold.

5. The wireless communication system of claim 1 wherein the first base station has a coverage area which is used to determine the first threshold and the second threshold.

6. The wireless communication system of claim 1 wherein a soft handoff is performed by transitioning communications of one of the plurality of wireless communication devices between the first frequency band of the first base station and the first frequency band of the second base station.

7. The wireless communication system of claim 1 wherein a hard handoff is performed by transitioning communications of one of the plurality of wireless communication devices between the second frequency band of the first base station and the first frequency band of the second base station.

8. A method of operating a wireless communication system comprising:
    transmitting wireless communication signals from a first base station over a first frequency band and over a second frequency band;
    transmitting wireless communication signals from a second base station over the first frequency band;
    processing loading of the first frequency band of the first base station to determine a user priority between the first frequency band of the first base station and the second frequency band of the first base station;
    transmitting an indication of the user priority to a plurality of wireless communication devices, wherein the plurality of wireless communication devices select between the first frequency band and the second frequency band based on the user priority;
    determining a distance between the first base station and a wireless communication device which is utilizing the second frequency band of the first base station;
    determining a velocity of the wireless communication device; and
    transmitting a message for delivery to the wireless communication device if the distance exceeds a first threshold or the velocity exceeds a second threshold.

9. The method of claim 8 wherein the message comprises instructions to initiate future calls using the first frequency band.

10. The method of claim 8 wherein the user priority comprises a list which includes the first frequency band of the first base station, the second frequency band of the first base station, and the first frequency band of the second base station.

11. The method of claim 10 wherein the second frequency band of the first base station is assigned a higher priority than the first frequency band of the first base station if the loading of the first frequency band of the first base station exceeds a third threshold.

12. The method of claim 8 wherein the first base station has a coverage area which is used to determine the first threshold and the second threshold.

13. The method of claim 8 further comprising performing a soft handoff wherein communications of one of the plurality of wireless communication devices are transitioned between the first frequency band of the first base station and the first frequency band of the second base station.

14. The method of claim 8 further comprising performing a hard handoff wherein communications of one of the plurality of wireless communication devices are transitioned between the second frequency band of the first base station and the first frequency band of the second base station.

15. A software product for operating a wireless communication system comprising:
    software operational when executed by a processor to direct the processor to transmit wireless communication signals over a first frequency band and over a second frequency band from a first base station, transmit wireless communication signals over the first frequency band from a second base station, process loading of the first frequency band of the first base station to determine a user priority between the first frequency band of the first base station and the second frequency band of the first base station, transmit an indication of the user priority to a plurality of wireless communication devices, wherein the plurality of wireless communication devices select between the first frequency band and the second frequency band based on the user priority, determine a distance between the first base station and a wireless communication device which is utilizing the second frequency band of the first base station, determine a velocity of the wireless communication device, and, if the distance exceeds a first threshold or the velocity exceeds a second threshold, transmit a message for delivery to the wireless communication device; and
    a non-transitory storage medium configured to store the software.

16. The software product of claim 15 wherein the message comprises instructions to initiate future calls using the first frequency band.

17. The software product of claim 15 wherein the user priority comprises a list which includes the first frequency band of the first base station, the second frequency band of the first base station, and the first frequency band of the second base station.

18. The software product of claim 17 wherein the second frequency band of the first base station is assigned a higher priority than the first frequency band of the first base station if the loading of the first frequency band of the first base station exceeds a third threshold.

19. The software product of claim 15 wherein the processor is further directed to perform a soft handoff by transitioning communications of one of the plurality of wireless communication devices between the first frequency band of the first base station and the first frequency band of the second base station.

20. The software product of claim 15 wherein the processor is further directed to perform a hard handoff by transitioning communications of one of the plurality of wireless communication devices between the second frequency band of the first base station and the first frequency band of the second base station.

* * * * *